United States Patent [19]

Reese

[11] 4,202,609
[45] May 13, 1980

[54] EYEGLASSES

[76] Inventor: Donald M. Reese, P.O. Box 10, Darwin, Calif. 93522

[21] Appl. No.: 879,459

[22] Filed: Feb. 21, 1978

[51] Int. Cl.$^2$ .............................................. G02C 5/14
[52] U.S. Cl. .................................................. 351/111
[58] Field of Search ............ 351/110, 111, 57, 41–45, 351/114, 117; 350/179; 2/10, 11, 12–15, 424, 426, 427, 15, 10; D2/10–15, 424, 426, 427, 110, 263, 277, 231, 41, 233

[56] References Cited

U.S. PATENT DOCUMENTS

| 836,796 | 11/1906 | Anderson | 351/111 |
| 1,706,083 | 3/1929 | Simonds | 351/111 |
| 1,833,792 | 11/1931 | Pfaus et al. | 351/111 |

FOREIGN PATENT DOCUMENTS 293980  7/1928  United Kingdom ...................... 351/114

OTHER PUBLICATIONS

Barck, History of Spectacles, May 13, 1960, pp. 457, 463, "The Optician".

Primary Examiner—F. L. Evans
Assistant Examiner—B. W. de los Reyes
Attorney, Agent, or Firm—Jackson, Jones & Price

[57] ABSTRACT

Suspension Eyewear consists of a pair of ophthalmic lenses attached to a metal centerpiece in the manner of conventional rimless eyeglasses. Instead of hinges and temples there are two suspension lines attached to each lens near the outer edges, and at points sufficiently separated to provide stability. The plane of the front assembly to the face is controlled by adjusting the length of these lines in a device positioned just in front of and about midway the ear. A wirebound springwire attached to the adjusting device extends over and behind each ear to below the mastoid. These spring earwires will return the front assembly to proper alignment when it is lightly pushed or pulled, in any direction, and released.

13 Claims, 1 Drawing Figure

U.S. Patent
May 13, 1980
4,202,609
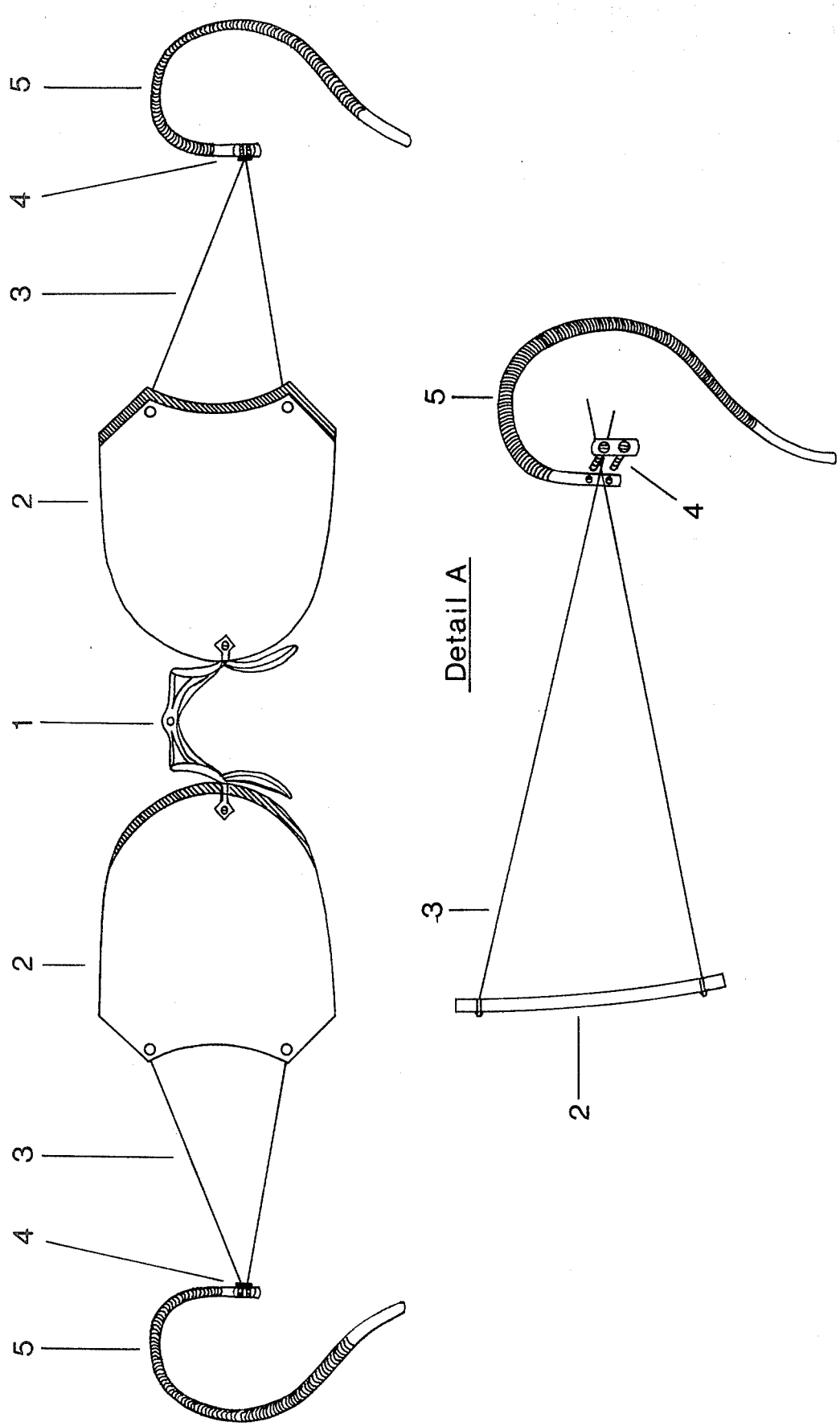
Detail A

EYEGLASSES

Suspension Eyewear is an appliance made of a pair of ophthalmic lenses or eyepieces attached to a metal centerpiece, such as the type used in rimless eyeglasses known as three-piece-mountings. Two small, flexible suspension lines are attached near the outer edge of each lens at points sufficiently separated to control the plane of the front assembly to the face, and to provide stability. The lines then converge just forward of the crus helicis where they enter a device which permits a controlled, precise adjustment of the length of the lines, individually. An earwire extends from the device, over and behind the ear to below the mastoid. The shape and construction of this wire will cause the front assembly to return to proper alignment when pushed or pulled, in any direction, and released.

Suspension Eyewear is an assembly of the following components; (see enclosed drawing). A centerpiece, (1), such as the Crosley Triflex, manufactured by American Optical Company; two lenses or eyepieces, (2), CR-39 hard-resin, or glass; four suspension lines, (3), one pound test monofilament or other suitable material; two suspension line adjusting devices, (4), (see detail A); and two earwires, (5), of wirewound springwire.

The lenses or eyepieces must be shaped to provide four points of attachment for the suspension lines. These points must be near the outer edge of the lenses and sufficiently separated to permit precise control of the plane of the front assembly to the face. The distance between these points may vary between twenty millimeters and sixty millimeters, dependent on the size and shape of the lenses. The lenses are attached to the centerpiece in the manner dictated by the lens support strap of the centerpiece.

The suspension lines can be made of any suitable material, such as one pound test monofilament line. They may be attached to the lenses by drilling into the lens at a point of attachment, and bedding one end of the line in epoxy resin in the hole. Or a hole can be drilled through the lens and the line secured in the hole by a pin pressed in from the front. The lines then converge just forward of the crus helicis where they pass through an adjusting device.

This device has two screws that are used to set a light tension against the lines, sufficient to hold them in place, while a careful and precise adjustment of the plane of the front assembly to the face is made, by slipping the lines, individually, in the adjusting device. When the adjustment has been completed, the screws are tightened to hold the suspension lines securely in place, and the excess line is removed.

The earwire is hard-soldered to the adjusting device. It is made of the kind of wirewound springwire of which the flexible end of a conventional cable temple is made. It extends from the adjusting device in front, to below the mastoid behind the ear, thus forming a securely mounted spring to which the suspension lines attach. When the front assembly is lightly pushed or pulled in any direction and released, the action of one or both springs will return it to proper alignment.

I claim:

1. An improved eyeglasses and support combination which comprises:
   a first transparent member and a second transparent member attached to the first transparent member, the combined first and second transparent members being configured to be disposed in front of a person's eyes in a desired plane substantially parallel with a plane defined by the front surface of the person's eyes;
   a first pair of suspension lines attached at two spaced apart points to the first transparent member;
   a second pair of suspension lines attached at two spaced apart points to the second transparent member;
   first and second earpiece members, each earpiece member being configured to be positioned over and behind a respective ear of the person and attached to a respective pair of suspension lines; and
   means for fastening the first and second pair of suspension lines to the respective earpiece members to adjustably position the combined first and second transparent members in said desired plane, a result of said combination being that the combined first and second transparent members are held to occupy said desired plane and are forced to return thereto after an inadvertent dislocation.

2. The invention of claim 1 wherein each ear piece member has a portion disposed in front of the person's respective ear, and wherein the means include a locking member fastened to said portion of the ear piece member, each pair of suspension lines being held between the locking member and said portion of the ear piece member.

3. The invention of claim 2 wherein the locking member is a plate, and the plate is fastened to said portion of the ear piece member by at least one screw.

4. The invention of claim 2 wherein the spaced apart points on the first and second transparent members are disposed substantially at respective outer edges of the transparent members.

5. The invention of claim 4 wherein the spaced apart points on each transparent member are separated from one another by a distance of approximately 20-60 milimeters.

6. The invention of claim 5 wherein each ear piece member comprises wirewound spring wire.

7. A combination of a pair of eyeglasses with an improved mounting assembly, said combination comprising:
   a first and a second lens held by a connecting piece in a substantially fixed spatial relationship relative to one another;
   a pair of earpiece members, each earpiece member configured to be disposed over and behind one ear and reaching below the mastoid of a person using the eyeglasses, and
   a suspension assembly including a first pair of suspension lines fixedly attached at one end to the first lens at two spaced apart points located substantially at the outer edge of the first lens and a second pair of suspension lines fixedly attached at one end to the second lens at two spaced apart points located substantially at the outer edge of the second lens; the other end of the suspension lines being attached to respective earpiece members to provide a predetermined length for each line to permit a positioning of the eyeglasses relative to the person's eyes whereby a plane of the first and second lenses is maintained in an optimal position substantially parallel with a plane defined by the person's eyes and whereby a coaction of the earpiece members with the suspension lines causes the pair of eyeglasses to be repositioned to the optimal position after an inadvertent dislocation of the eyeglasses.

8. The invention of claim 7 wherein each ear piece member comprises a spring earwire.

9. The invention of claim 7 further including a pair of keeper members, one of said keeper members being fixedly attached to each ear piece member for disposition in front of the person's ear, and a pair of locking members, one of said locking members being attachable to each of said keeper members with an adjustable force, each keeper member and locking member receiving one of said pair of suspension lines.

10. The invention of claim 9 wherein each locking member is a plate adapted to interface with the keeper member and is attached thereto by a plurality of screws.

11. In a combination of a pair of eyeglasses having a pair of transparent members attached to one another in a spatially fixed relationship and a mounting assembly adapted for mounting the eyeglasses in front of a person's eyes, the improvement comprising:

first and second pair of suspension lines, each pair of suspension lines being attached to a respective transparent member at two points spaced at a distance of at least 20 milimeters from each other and being located substantially at respective lateral edges of the respective transparent members;

a pair of earpiece members having spring like properties, each earpiece member being configured to be disposed over and behind one ear and reaching below the mastoid of a person, each earpiece member having a front portion to which one of the pairs of suspension lines is adjustably attached so that respective lengths of the suspension lines may be adjusted whereby the transparent members are maintained in an optimal position relative to the person in a plane substantially parallel with the plane of the person's eyes.

12. The improvement of claim 11 wherein the front portion of each earpiece member to which one pair of suspension lines is attached is a substantially flat plate having a locking member attached to it by at least one screw, the pair of suspension lines being kept between the flat plate and the locking member.

13. The improvement of claim 12 wherein the locking member is a substantially flat member attached to the first plate by a pair of screws.

* * * * *